United States Patent
Otake et al.

(10) Patent No.: US 8,554,369 B2
(45) Date of Patent: Oct. 8, 2013

(54) MACHINING SYSTEM AND METHOD

(75) Inventors: Yoshito Otake, Tochigi (JP); Tomohiro Sugimoto, Tochigi (JP); Gentoku Fujii, Tochigi (JP); Shinichiro Watanabe, Tochigi (JP); Takeshi Nakamura, Tochigi (JP); Ryo Nakajima, Tochigi (JP); Hideari Kamachi, Tochigi (JP)

(73) Assignee: Honda Motor Co., Ltd, Tokyo (JP)

( * ) Notice: Subject to any disclaimer, the term of this patent is extended or adjusted under 35 U.S.C. 154(b) by 348 days.

(21) Appl. No.: 13/026,551

(22) Filed: Feb. 14, 2011

(65) Prior Publication Data

US 2011/0208347 A1   Aug. 25, 2011

(30) Foreign Application Priority Data

Feb. 22, 2010   (JP) .................................. 2010-036203

(51) Int. Cl.
- *G06F 19/00*   (2011.01)
- *G05B 19/418*   (2006.01)
- *B25J 9/00*   (2006.01)

(52) U.S. Cl.
CPC ........... *G05B 19/4182* (2013.01); *B25J 9/0093* (2013.01)
USPC ............................ 700/248; 700/114; 700/259

(58) Field of Classification Search
CPC ................. G05B 2219/39102; G05B 19/4182; B25J 9/0093
USPC ............. 700/114, 186, 259, 248; 414/416.01; 348/94; 318/560; 198/349
See application file for complete search history.

(56) References Cited

U.S. PATENT DOCUMENTS

| | | | | |
|---|---|---|---|---|
| RE30,016 E | * | 5/1979 | Hohn | 700/253 |
| 4,817,017 A | * | 3/1989 | Kato | 700/254 |
| 5,727,132 A | * | 3/1998 | Arimatsu et al. | 700/259 |
| 7,403,836 B2 | * | 7/2008 | Aoyama | 700/259 |
| 7,654,380 B2 | * | 2/2010 | Nishihara et al. | 198/349 |
| 8,014,899 B2 | * | 9/2011 | Ban et al. | 700/248 |
| 2004/0086364 A1 | * | 5/2004 | Watanabe et al. | 414/416.01 |
| 2007/0179671 A1 | * | 8/2007 | Arimatsu et al. | 700/247 |
| 2008/0163403 A1 | * | 7/2008 | Tominaga | 901/2 |
| 2010/0114370 A1 | * | 5/2010 | Sasaki | 700/248 |
| 2011/0087360 A1 | * | 4/2011 | Chen et al. | 700/114 |
| 2011/0106311 A1 | * | 5/2011 | Nakajima et al. | 700/253 |

FOREIGN PATENT DOCUMENTS

JP     2004-203106     7/2004

* cited by examiner

*Primary Examiner* — Dave Robertson
(74) *Attorney, Agent, or Firm* — Rankin, Hill & Clark LLP (57) ABSTRACT

According to the present invention, even during and immediately before a machining operation by a machining apparatus, it is possible to improve positioning control accuracy thereof and, as a result, machining accuracy thereof. A robot 11 equipped with a machining tool 12 performs a moving operation to a target position 41 of a machining target workpiece 2 and a machining operation on the machining target. A robot moving mechanism 14 moves the robot 11 in parallel with the workpiece 2 that is being conveyed by a conveyance carriage 18. A robot control device 17 controls movement of the robot moving mechanism 14 using a detection result of a synchronizing sensor 15 and carries out positioning control of the robot 11 using the detection result of a visual sensor 13 or a synchronizing sensor 15.

4 Claims, 5 Drawing Sheets

MACHINING SYSTEM AND METHOD

This application is based on and claims the benefit of priority from Japanese Patent Application No. 2010-036203 filed on Feb. 22, 2010, the content of which is incorporated herein by reference.

BACKGROUND OF THE INVENTION

1. Field of the Invention

The present invention relates to a machining system and method for machining a workpiece that is being conveyed, and more particularly to a machining system and method capable of improving positioning control accuracy of a machining apparatus curing and immediately before the machining operation and, as a result, improving machining accuracy by the machining apparatus.

2. Related Art

Conventionally, on a machining line that machines a workpiece such as a vehicle body, there are provided a conveyance carriage to convey the workpiece and a machining apparatus such as a robot to carry out machining processing on the workpiece (see Japanese Unexamined Patent Application, Publication No. 2004-203106, for example).

Such a machining apparatus is provided with an arm constituted by a multi-joint manipulator or the like, and a machining tool attached to a tip of the arm.

The arm of the machining apparatus moves the machining tool to have a tip of the machining tool placed close to a machining target within the workpiece. Then, the machining tool of the machining apparatus performs a machining operation on the machining target such as bolt tightening or welding.

SUMMARY OF THE INVENTION

There is a case, however, in which relative misalignment of the machining target arises due to vibration or the like of the workpiece, since the workpiece is automatically being conveyed during the machining operation by the machining tool. Therefore, there is a need to compensate for the misalignment of the machining target while continuing the moving operation of the arm of the machining apparatus during the machining operation of the machining tool.

Incidentally, in control (hereinafter, referred to as "positioning control") of placing the tip position of the machining tool close to the target position by moving the arm, a camera or the like attached to the machining tool or to the tip of the arm is employed as a visual sensor, and information on the machining target detected by the visual sensor is employed as feedback information.

Accordingly, the visual sensor may fail to detect the machining target during or immediately before the machining operation by the machining tool. In such a case, since no effective feedback information is available, the positioning control accuracy deteriorates. Such accuracy deterioration in the positioning control leads to an increase in positioning error between positions of the tip of the machining tool and the machining target and, consequently, deteriorates machining accuracy of the machining tool.

The present invention is directed to a machining system and method for machining a workpiece that is being conveyed, and it is an object of the present invention to provide a machining system and method capable of improving the positioning control accuracy of the machining apparatus during and immediately before the machining operation of the machining apparatus and, as a result, improving machining accuracy of the machining apparatus.

According to the present invention, there is provided a machining system (for example, a machining system 1 in the embodiment described later) for performing predetermined machining on a machining target (for example, a target position 41 in an embodiment described later) of a workpiece (for example, a workpiece 2 in the embodiment described later) that is being conveyed, the system comprising:

a conveyance unit (for example, a conveyance carriage 18 in the embodiment described later) that conveys the workpiece;

a machining unit (for example, a robot 11 equipped with the machining tool 12 in an embodiment described later) that carries out a moving operation as far as the machining target of the workpiece, and a machining operation on the machining target;

a moving unit (for example, a robot moving mechanism 14 in an embodiment described later) that moves the machining unit in parallel with the workpiece that is being conveyed by the conveyance unit;

a machining target detection unit (for example, a visual sensor 13 in an embodiment described later) that is attached to the machining unit and detects the position of the machining target;

a conveyance detection unit (for example, a synchronizing sensor 15 in an embodiment described later) that is attached to the moving unit and detects a specified position of the conveyance unit; and a control unit (for example, a robot control device 17 in an embodiment described later) that controls movement of the moving unit using a detection result by the conveyance detection unit, and controls the moving operation of the machining unit using a result of detection by the machining target detection unit or the conveyance detection unit.

According to the present invention, it is possible to carry out motion control of a machining unit (positioning control in an embodiment described later) using a detection result of a conveyance detection unit that is attached to a movement unit to detect a specific position of a conveying unit as well as a detection result of a machining target detection unit that is attached to the machining unit to detect the position of a machining target.

This means that, for example, in a case in which no detection result from the machining target detection unit is available or, if any, the detection result is of low accuracy, it is possible to carry out positioning control of the machining unit employing the detection result of the conveyance detection unit, instead of the machining target detection unit.

With this, even during and immediately before a machining operation of the machining unit, the positioning control accuracy of the machining unit and, as a result, the machining accuracy thereof are improved.

In this case, the control unit can include a switching unit (for example, the feedback switching unit 64 in the embodiment described later) for switching the information used in movement control of the machining unit from a detection result of one of the machining target detection unit and the conveyance detection unit, to a detection result of the other thereof, when a predetermined condition is satisfied.

Furthermore, in this case, in a state in which the detection result of the machining target detection unit is employed for the movement control of the machining unit, the switching unit can switch the information employed for the movement control of the machining unit to the detection result of the conveyance detection unit when the predetermined condition, being a condition that the machining target detection unit is unable to detect any object, is satisfied The machining method according to the present invention is a method corresponding to the machining system according to the present invention described above. Therefore, the machining method according to the present invention can have a similar effect as the machining system according to the present invention described above.

According to the present invention, it is possible to carry out movement control (positioning control in the embodiment described later) of a machining unit using a detection result of a conveyance detection unit that is attached to a movement unit to detect a specific position of a conveying unit as well as a detection result of a machining target detection unit that is attached to the machining unit to detect the position of a machining target.

This means that, for example, in a case in which no detection result from the machining target detection unit is available or, if any, the detection result is of low accuracy, it is possible to carry out the positioning control of the machining unit employing the detection result of the conveyance detection unit, instead of the machining target detection unit.

With this, even during and immediately before a machining operation of the machining unit, the positioning control accuracy of the machining unit and, as a result, the machining accuracy thereof are improved.

DETAILED DESCRIPTION OF THE INVENTION

The following describes an embodiment of the present invention with reference to the drawings.

Figure 1:
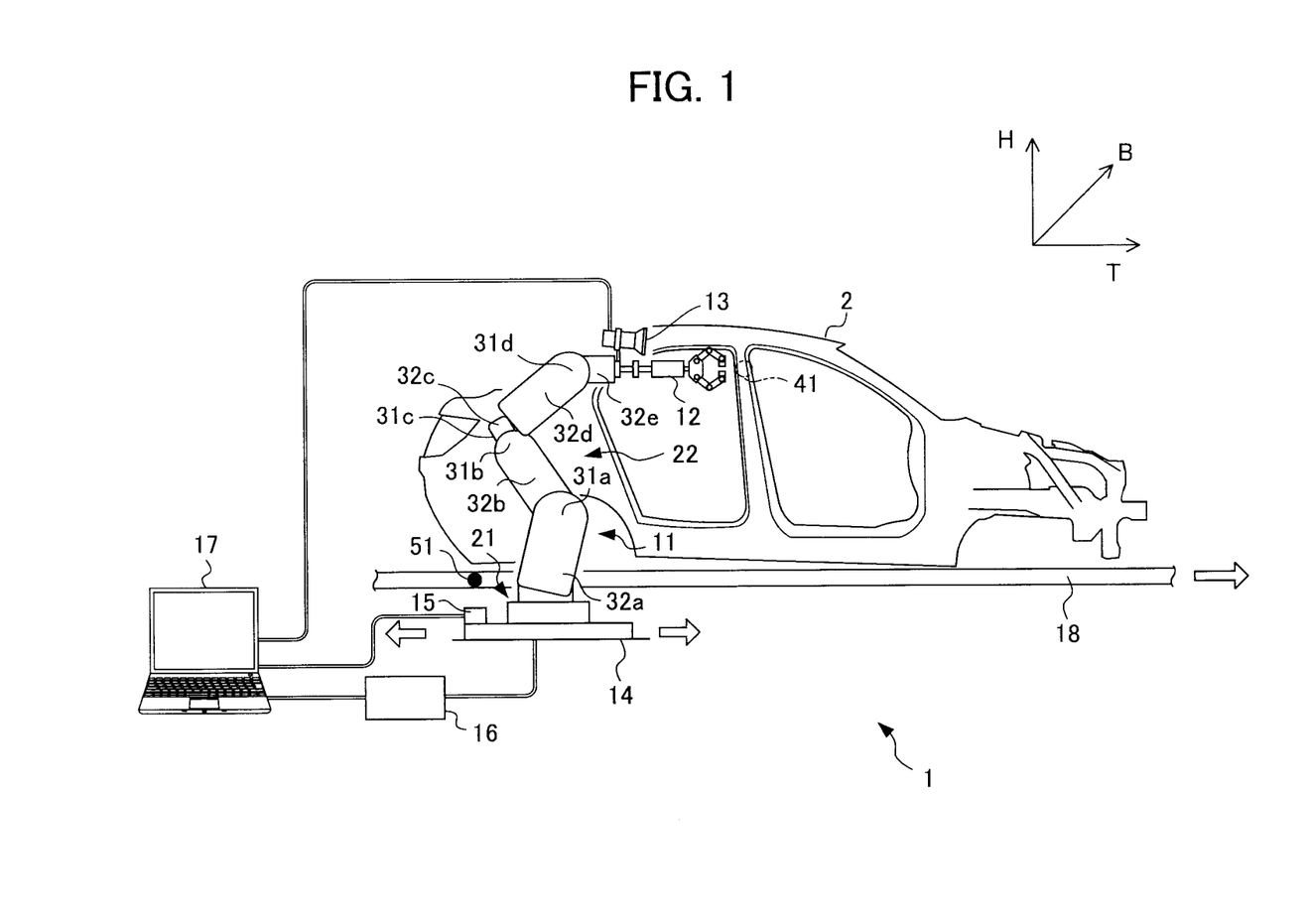
FIG. 1 is a side view showing an outline of an external configuration of a machining system according to an embodiment of the present invention.

FIG. 1 is a side view showing an outline of an external configuration of the machining system 1 according to an embodiment of the present invention. For example, the machining system 1 is provided on a continuous conveyor line in a vehicle production line and performs various machining such as welding or bolt tightening on a workpiece 2 such as a vehicle body that is being continuously conveyed.

The machining system 1 is provided with a robot 11, a machining tool 12, a visual sensor 13, a robot moving mechanism 14, a synchronizing sensor 15, a robot driving device 16, a robot control device 17, and a conveyance carriage 18.

The robot 11 is provided with a base (hereinafter, referred to as a "robot base 21") mounted on the robot moving mechanism 14 and an arm 22 pivotally mounted on the robot base 21. The arm 22 is configured as a multi-joint manipulator. That is, the arm 22 is provided with joints 31a to 31d, connecting members 32a to 32e, servo motors (not shown) for rotating the joints 31a to 31d, and detectors (not shown) for detecting various states such as position, speed, or electric current of the servo motors.

The whole operation of the arm 22, i.e., the whole operation of the robot 11 is realized by the combination of a rotating operation of the joints 31a to 31d by means of the servo motors and a moving operation of the connecting members 32a to 32e linked with the rotating operation of the joints 31a to 31d.

The machining tool 12 is attached as an end effector at the tip of the connecting member 32e of the arm 22. By way of the moving operation of the arm 22, the tip thereof moves up to a position (hereinafter, referred to as "target position"), such as the target position 41 shown in FIG. 1, where a machining target in the workpiece 2 is provided. Then, the machining tool 12 performs various machining operations such as welding or bolt tightening on the machining target at the target position 41 under the control of the robot control device 17.

As described above, in the present embodiment, the machining apparatus is the robot 11 in such a state that the machining tool 12 is attached to the arm 22. This means that the machining apparatus of the present embodiment includes the robot 11 and the machining tool 12.

The visual sensor 13 is configured by a camera or the like and is fixedly attached to a periphery of the connecting member 32e of the arm 22 so that the tip of the machining tool 12 can be photographed as the center of the field of view thereof.

The visual sensor 13 captures an image of a subject in the field of view thereof in the direction of the tip of the machining tool 12. Hereinafter, an image of a subject captured by the visual sensor 13 is referred to as "captured image".

The robot control device 17, which will be described later, can easily acquire coordinates of the target position 41 in a coordinate system (hereinafter, referred to as "camera coordinate system") having an origin thereof at the position of the visual sensor 13 by way of carrying out image processing on the data of an captured image. Hereinafter, the coordinates of the target position 41 in the camera coordinate system are referred to as "visual sensor position".

The robot moving mechanism 14, under the control of the robot control device 17, which will be described later, moves the robot base 21 synchronously with the continuous conveyance of the workpiece 2 by the conveyance carriage 18, substantially parallel with the conveying direction of the workpiece 2 (in the direction of the white arrows shown in FIG. 1), for example.

Hereinafter, for ease of description, a direction of continuous conveyance of the workpiece 2 by the conveyance carriage 18 is referred to as "T-direction" in correspondence with the description of FIG. 1. A horizontal direction from the robot moving mechanism 14 to the conveyance carriage 18, perpendicular to the T-direction, is referred to as "B-direction" in correspondence with the description of FIG. 1. A vertical upward direction, perpendicular to both the T-direction and the B-direction is referred to as "H-direction" in correspondence with the description of FIG. 1.

The synchronizing sensor 15 is fixed to the robot moving mechanism 14 and detects the position of a detection target 51 defined as a sticker, a hole, or the like provided at a specific position of the conveyance carriage 18.

There is no limitation to a coordinate system used by the synchronizing sensor 15 to detect a position. In the present embodiment, however, a coordinate system (hereinafter, referred to as "robot coordinate system") is employed that has the origin thereof at a predetermined position in the robot moving mechanism 14 such as the center of the robot base 21, for example.

This means that, in the present embodiment, the synchronizing sensor 15 detects coordinates of a relative position (hereinafter, referred to as "synchronizing sensor position")

of the conveyance carriage 18 (the detection target 51) viewed from the robot moving mechanism 14 (the robot base 21).

The synchronizing sensor position detected by the synchronizing sensor 15 is provided to the robot control device 17, which will be described later, and employed as feedback information for control (hereinafter, referred to as "synchronizing control with the conveyance carriage 18") that causes the robot moving mechanism 14 to move in synchronization with the conveyance carriage 18.

Furthermore, if necessary, the synchronizing sensor position is employed as feedback information for positioning control of the robot 11. Details of the positioning control will be described later with reference to FIG. 2 and subsequent drawings.

An instruction (hereinafter, referred to as a "movement instruction") to move the tip position of the machining tool 12 connected to the arm 22 of the robot 11 to the target position 41 is provided to the robot driving device 16 from the robot control device 17, which will be described later. Then, in accordance with the movement instruction, the robot driving device 16 carries out a torque (current) control of servo motors built in the arm 22 employing the values detected by respective detectors built in the arm 22 as feedback values. With this, the overall operation of the arm 22, i.e., the overall operation of the robot 11 is controlled.

The robot control device 17 carries out positioning control of the robot 11 and movement control of the robot moving mechanism 14. Also, the robot control device 17 carries out control of changing a machining condition for the machining tool 12 and control of machining operation of the machining tool 12. Here, the machining condition is, for example, a condition of electric current required for welding in a case in which the machining tool 12 is a welder.

The conveyance carriage 18 continuously conveys the workpiece 2 in a predetermined direction, which is the T-direction in the present embodiment.

In the following, the robot control device 17 will be described in further detail with reference to FIGS. 2 and 3.

Figure 2:
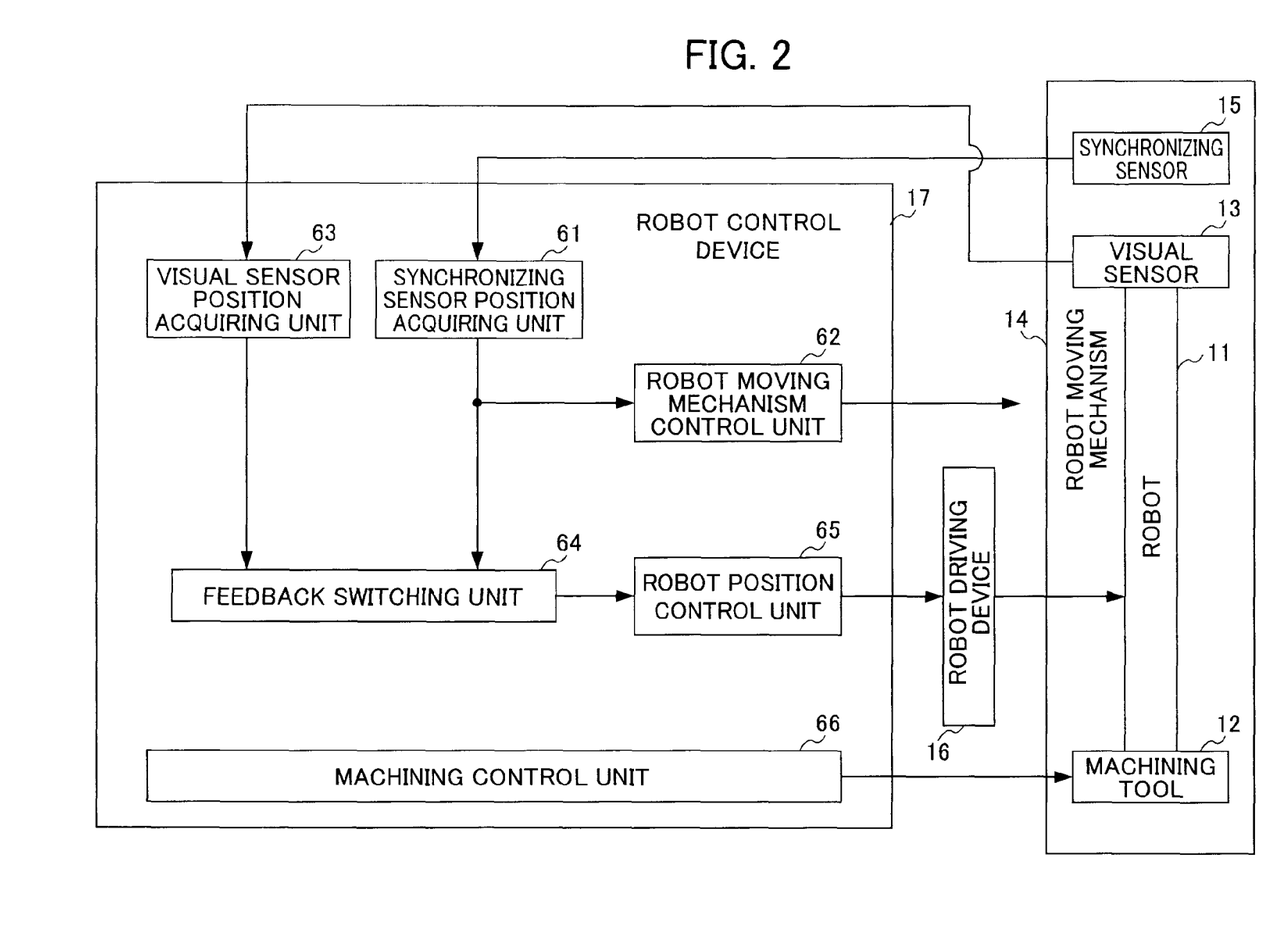
FIG. 2 is a functional block diagram showing one example of a functional configuration of the robot control device of the machining system shown in FIG. 1.

FIG. 2 is a functional block diagram showing one example of functional configuration of the robot control device 17.

The robot control device 17 is provided with a synchronizing sensor position acquiring unit 61, a robot moving mechanism control unit 62, a visual sensor position acquiring unit 63, a feedback switching unit 64, a robot position control unit 65, and a machining control unit 66.

The synchronizing sensor position acquiring unit 61 acquires a synchronizing sensor position, i.e., a relative position of the conveyance carriage 18 (the detection target 51) viewed from the robot moving mechanism 14 (the robot base 21), and provides it to the robot moving mechanism control unit 62 and the feedback switching unit 64.

The robot moving mechanism control unit 62 carries out synchronizing control of the robot moving mechanism 14 (the robot base 21) with the conveyance carriage 18 based on the synchronizing sensor position provided from the synchronizing sensor position acquiring unit 61.

This means that the robot moving mechanism control unit 62 controls a moving operation of the robot moving mechanism 14 in the T-direction so that the synchronizing sensor position remains constant.

The visual sensor position acquiring unit 63 acquires and provides to the feedback switching unit 64 coordinates of the position of the target position 41 of the machining target in the camera coordinate system, i.e., the visual sensor position, based on the image data of the captured image outputted from the visual sensor 13.

The feedback switching unit 64 switches the position information to be inputted as feedback information for positioning control of the robot 11.

For example, the feedback switching unit 64 inputs the visual sensor position as a default from the visual sensor position acquiring unit 63, and supplies it to the robot position control unit 65 as feedback information.

After that, when a predetermined switching condition is satisfied, e.g., when the machining target at the target position 41 is no longer included in the captured image of the visual sensor 13, for example, immediately before the machining operation by the machining tool 12, the feedback switching unit 64 switches the input source from the visual sensor position acquiring unit 63 to the synchronizing sensor position acquiring unit 61.

Then, the feedback switching unit 64 inputs the synchronizing sensor position from the synchronizing sensor position acquiring unit 61 and provides it to the robot position control unit 65 as feedback information.

The robot position control unit 65 carries out positioning control of the robot 11 using the feedback information supplied from the feedback switching unit 64.

This means that the robot position control unit 65 acquires deviation between the target position 41 and the tip position of the machining tool 12 from the feedback information and controls the moving operation of the robot 11 (more precisely, the arm 22) so that the deviation is eliminated.

In the present embodiment, since the target position 41 is different depending on the workpiece 2, in the case of default input, i.e., in the case in which the visual sensor position is supplied as feedback information, the robot position control unit 65 controls the moving operation of the robot 11 in all of the T-direction, the B-direction, and the H-direction.

This means that the robot position control unit 65 acquires deviations in all of the T-direction, B-direction, and H-direction based on the visual sensor position. Then the robot position control unit 65 carries out control of generating movement instructions in all of the T-direction, B-direction, and H-direction based on the deviations and of providing the movement instructions to the robot driving device 16, as positioning control of the robot 11.

Upon receiving the movement instructions, the robot driving device 16 causes the robot 11 to move in accordance with the movement instructions as described above, to have the tip of the machining tool 12 placed close to the target position 41.

This means that, in the present embodiment, as default positioning control of the robot 11, control (hereinafter, referred to as "visual servo control") is employed that uses the visual sensor position acquired from the captured image of the visual sensor 13 as feedback information.

As a result of such visual servo control, when the deviation described above disappears, the visual servo control by the robot position control unit 65 stops, and the moving operation of the robot 11 is halted.

Then, the machining control unit 66 performs control of the machining operation of the machining tool 12. This means that the machining tool 12 performs a machining operation such as bolt tightening or welding on the machining target at the target position 41.

During and immediately before such a machining operation of the machining tool 12, there are cases where the machining target at the target position 41 is not included in the captured image of the visual sensor 13 and therefore no visual sensor position is available. In such a case, due to inability to carry out the visual servo control, the feedback information for use is switched from the visual sensor position to the synchronizing sensor position.

In this case, if the workpiece 2 remains stationary from the viewpoint of the robot 11, the tip position of the machining tool 12 and the target position 41 are substantially in accord with each other as a result of the visual servo control. Since the synchronizing control of the robot moving mechanism 14 with the conveyance carriage 18 is continuing, the relative motion of the workpiece 2 in the T-direction from the viewpoint of the robot 11 is negligible. However, there are cases where the workpiece 2 being conveyed by the conveyance carriage 18 vibrates in the B-direction or H-direction from the viewpoint of the robot 11.

For this reason, when the synchronizing sensor position is provided as feedback information, the robot position control unit 65 carries out positioning control of the robot 11 in the B-direction and H-direction, and compensates for the error caused by the vibration of the workpiece 2 in the B-direction and H-direction.

This means that the robot position control unit 65 acquires deviations in the B-direction and H-direction based on the synchronizing sensor position. The robot position control unit 65 carries out control of generating movement instructions in the B-direction and H-direction based on the deviations and of providing the movement instructions to the robot driving device 16, as positioning control of the robot 11.

The robot driving device 16, provided with the movement instructions, causes the robot 11 to move in accordance with the movement instructions as described above to have the tip of the machining tool 12 placed close to the target position 41.

The above is a description of an example of a functional configuration of the robot control device 17. In the following, an example of a hardware configuration of the robot control device 17 having such a functional configuration will be described.

Figure 3:
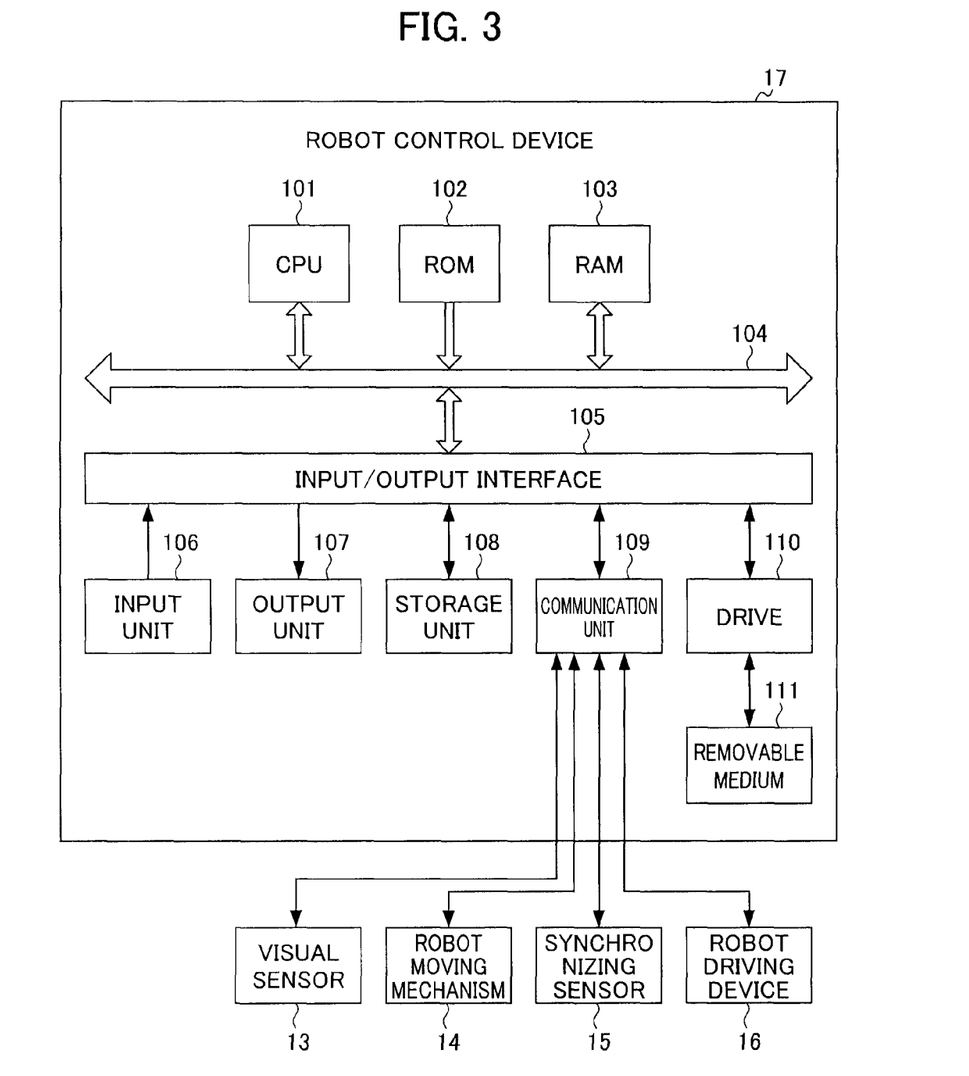
FIG. 3 is a block diagram showing one example of a hardware configuration of the robot control device shown in FIG. 2.

FIG. 3 is a block diagram showing one example of a hardware configuration of the robot control device 17.

The robot control device 17 is provided with a CPU (Central Processing Unit) 101, a ROM (Read Only Memory) 102, a RAM (Random Access Memory) 103, a bus 104, an input/output interface 105, an input unit 106, an output unit 107, a storage unit 108, a communication unit 109, and a drive 110.

The CPU 101 executes various processes according to programs that are stored in the ROM 102. Alternatively, the CPU 101 executes various processes according to programs that are loaded from the storage unit 108 to the RAM 103. The RAM 103 also stores data and the like necessary for the CPU 101 to execute the various processes appropriately.

For example, according to the present embodiment, programs for executing the functions of the synchronizing sensor position acquiring unit 61, the robot moving mechanism control unit 62, the visual sensor position acquiring unit 63, the feedback switching unit 64, the robot position control unit 65, and the machining control unit 66, shown in FIG. 2 described above, are stored either in the ROM 102 or in the storage unit 108. Therefore, each of the functions of the synchronizing sensor position acquiring unit 61, the robot moving mechanism control unit 62, the visual sensor position acquiring unit 63, the feedback switching unit 64, the robot position control unit 65, and the machining control unit 66 can be realized by the CPU 101 executing the processes in accordance with these programs. One example of a process according to such a program will be described later with reference to the flowchart of FIG. 4.

The CPU 101, the ROM 102, and the RAM 103 are connected to one another via the bus 104. The bus 104 is also connected with the input/output interface 105.

The input unit 106 constituted by a keyboard and the like, the output unit 107 constituted by a display device, a speaker and the like, the storage unit 108 constituted by a hard disk and the like, and the communication unit 109 are connected to the input/output interface 105.

The communication unit 109 controls communication with the visual sensor 13, communication with the robot moving mechanism 14, communication with the synchronizing sensor 15, communication with the robot driving device 16, and communication with other devices (not shown) via a network including the Internet. In the example of FIG. 1, such communications are described as being wired, but wireless communication is also possible.

The input/output interface 105 is also connected with the drive 110 as necessary, and a removable medium 111 constituted by a magnetic disk, an optical disk, a magnetic optical disk, semiconductor memory, or the like is loaded accordingly. The programs read from these devices are installed in the storage unit 108 as necessary.

Figure 4:
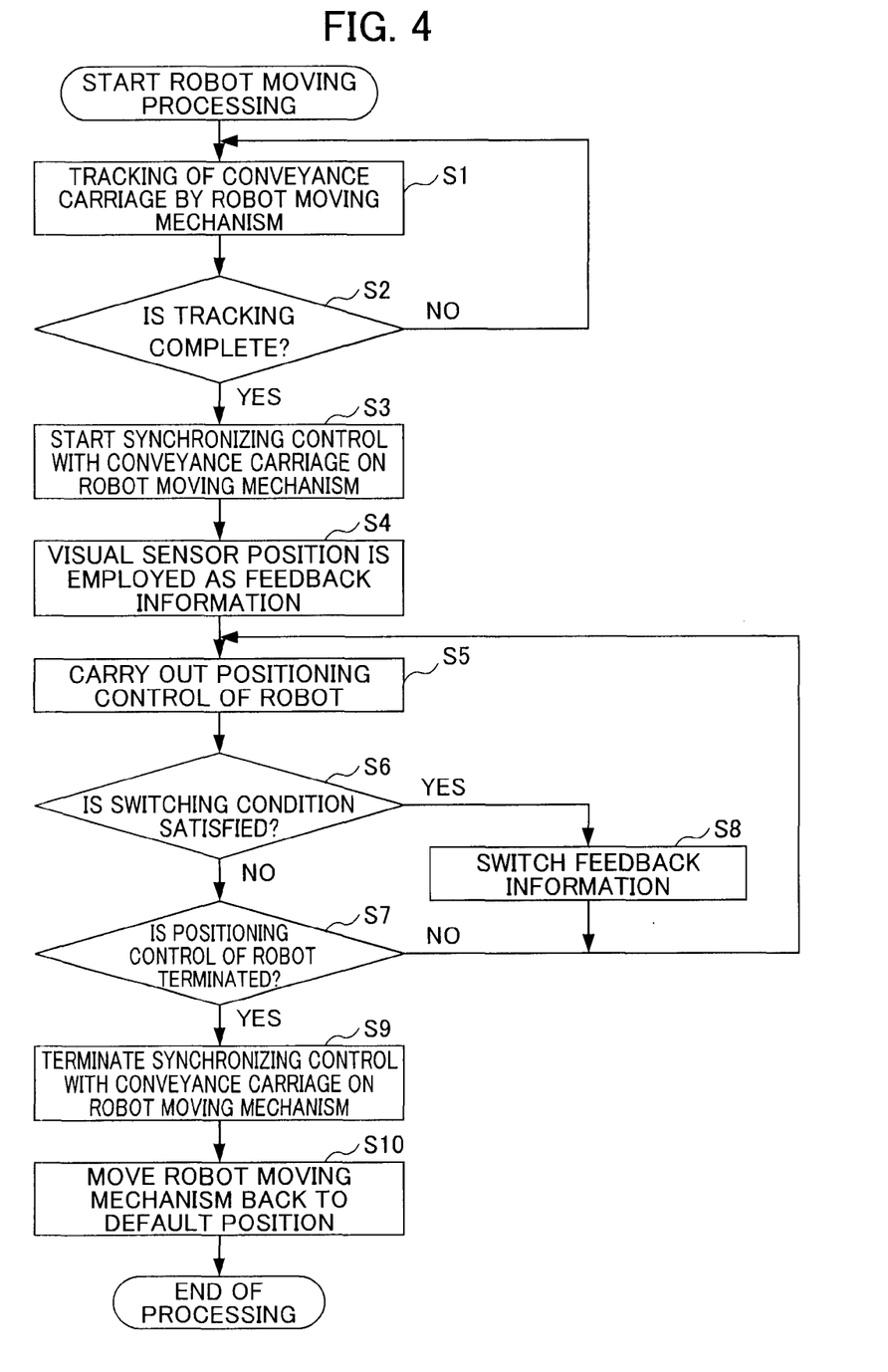
FIG. 4 is a flowchart showing flow of a robot moving processing by the robot control device shown in FIG. 2.

FIG. 4 is a flowchart showing flow of processing (hereinafter, referred to as "robot moving processing") that realizes the movement control of the robot moving mechanism 14 (the robot base 21) and the positioning control of the robot 11 (the arm 22) carried out by the robot control device 17 having such a configuration.

Figure 5:
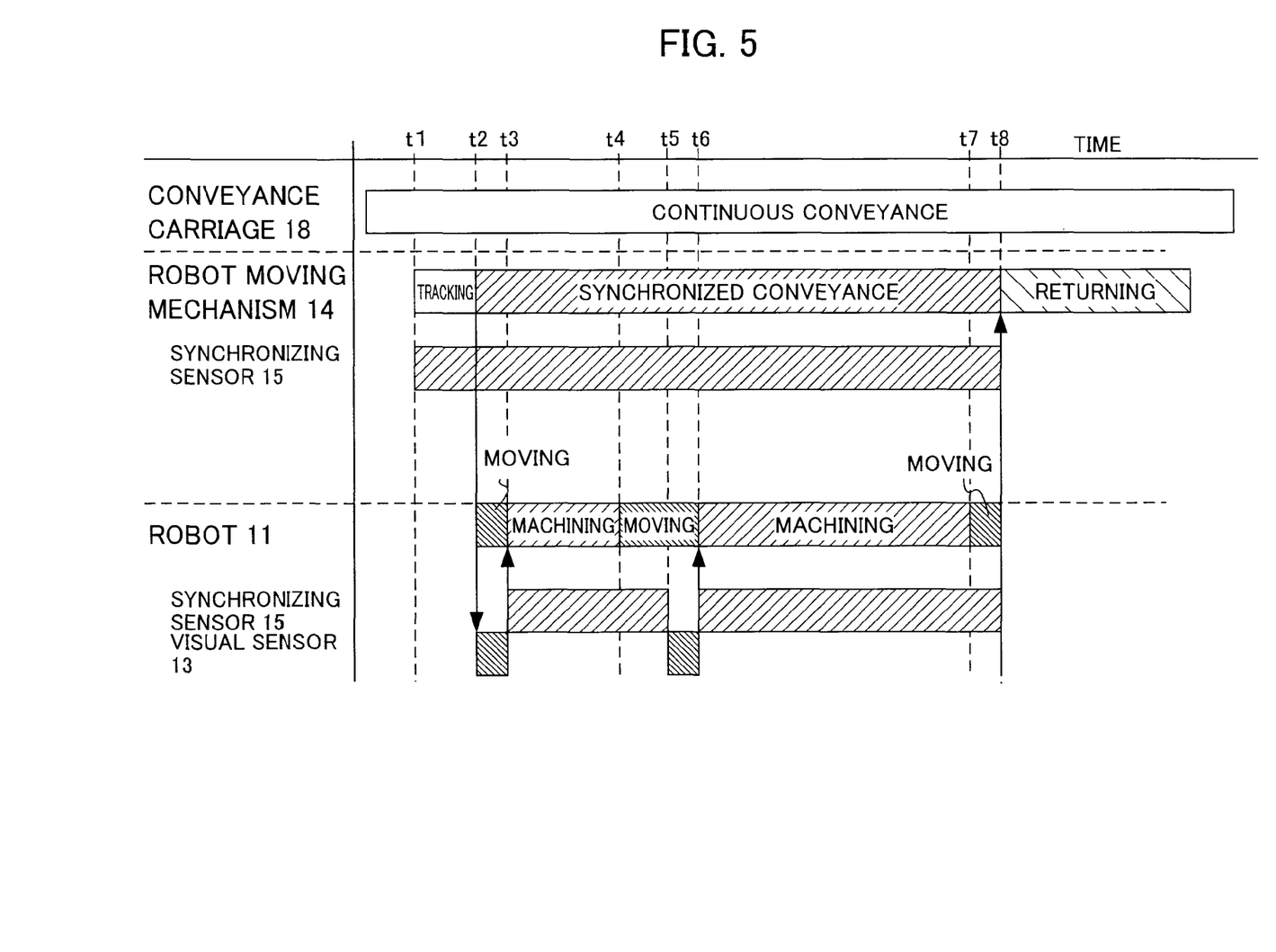
FIG. 5 is a timing chart illustrating one example of a result of the robot moving processing shown in FIG. 4.

FIG. 5 is a timing chart illustrating one example of the result of the robot moving processing.

In detail, FIG. 5 illustrates, in order from top to bottom, the operation period of the conveyance carriage 18, the operation period of the robot moving mechanism 14, the period when the synchronizing sensor position of the synchronizing sensor 15 is used for movement control of the robot moving mechanism 14, the operation period of the robot 11 equipped with the machining tool 12, the period when the synchronizing sensor position of the synchronizing sensor 15 is used for positioning control of the robot 11, and the period when the visual sensor position of the visual sensor 13 is used for positioning control of the robot 11.

In the description in FIGS. 4 and 5, the main operation unit for processing carried out by the robot control device 17 is assumed to be the CPU 101 shown in FIG. 3.

When the automatic conveyance of the workpiece 2 by the conveyance carriage 18 starts, the position of the detection target 51, which is arranged on the conveyance carriage 18, becomes detectable by the synchronizing sensor 15 fixed to the robot moving mechanism 14 located at the default position. As a result thereof, the synchronizing sensor 15 starts output of the synchronizing sensor position, and then the robot moving processing starts.

For example, at time t1 in FIG. 5, the robot moving processing starts.

In step S1, the CPU 101 controls the robot moving mechanism 14 to track the conveyance carriage 18.

This means that the CPU 101 carries out movement control in the T-direction of the robot moving mechanism 14 so that the synchronizing sensor position remains at a predetermined position.

In step S2, the CPU 101 determines whether or not the tracking is complete.

Though there is no limitation to the determination method in step S2, in the present embodiment, a method is employed in which a determination is made as to whether the tracking is complete when the synchronizing sensor position maintains a predetermined position.

Therefore, if the synchronizing sensor position is different from the predetermined position or is unstable due to changing to another position just after reaching the predetermined position, NO is determined in step S2, control goes back to step S1, and the processes thereafter are repeated.

This means that loop processing of step S1 and step S2: NO is repeated, and the tracking of the conveyance carriage 18 is carried out by the robot moving mechanism 14 under the control of the CPU 101.

After that, when the synchronizing sensor position maintains the predetermined position, for example, at time t2 in FIG. 5, the tracking is complete, YES is determined in step S2, and control proceeds to step S3.

In step S3, the CPU 101 starts synchronizing control of the robot moving mechanism 14 with the conveyance carriage 18.

This means that the CPU 101 starts movement control of the robot moving mechanism 14 in the T-direction so that the synchronizing sensor position remains at the predetermined position.

In step S4, the CPU 101 sets the visual sensor position as feedback information used for the positioning control of the robot 11.

In step S5, the CPU 101 carries out positioning control of the robot 11.

In step S6, the CPU 101 determines whether or not a switching condition is satisfied.

Though there is no limitation to the switching condition, in the present embodiment, as described above, a condition is employed as the switching condition from the visual sensor position to the synchronizing sensor position, that the machining target at the target position 41 is no longer included in the captured image of the visual sensor 13, i.e., the visual sensor position is no longer available.

Therefore, while the machining target at the target position 41 is included in the captured image of the visual sensor 13 and therefore the visual sensor position is available, NO is determined in step S6, and control proceeds to step S7.

In step S7, the CPU 101 determines whether or not positioning control of the robot 11 is terminated.

Though there is no limitation to the condition of determining in step S7, in the present embodiment the positioning control of the robot 11 is determined to be terminated when the machining operation of the machining tool 12 on the machining target in the workpiece 2 is complete, and the tip position of the machining tool 12 returns to the default position.

Therefore, before and during the machining operation of the machining tool 12, NO is determined in step S7, control goes back to step S5, and the processes thereafter are repeated.

This means that before the machining operation of the machining tool 12 is started, while the machining target at the target position 41 is included in the captured image of the visual sensor 13 and the visual sensor position can be obtained, loop processing of step S5, step S6: NO, and step S7: NO is repeated, and the visual servo control using the visual sensor position in all of the T-direction, B-direction, and H-direction is carried out as positioning control of the robot 11.

For example, during the period between times t2 and t3 described as "moving" in the timing chart of the robot 11 in FIG. 5, the visual servo control using the visual sensor position in all of the T-direction, B-direction, and H-direction is carried out as the positioning control of the robot 11.

As a result of such visual servo control, when the deviation described above disappears, the visual servo control stops, and the moving operation of the robot 11 is halted.

Then, The CPU 101 controls the machining operation of the machining tool 12. That is, the machining tool 12 performs a machining operation such as bolt tightening or welding on the machining target at the target position 41.

For example, during the period between times t3 and t4 described as "machining" in the timing chart of the robot 11 shown in FIG. 5, the machining operation of the machining tool 12 is performed.

Therefore, for example, at time t3 shown in FIG. 5, the machining target at the target position 41 is no longer included in the captured image of the visual sensor 13 and therefore the visual sensor position can no longer be obtained. That is, since the switching condition is satisfied at time t3, YES is determined in step S6, and control proceeds to step S8.

In step S8, the CPU 101 switches the feedback information from the visual sensor position to the synchronizing sensor position.

Control goes back to step S5 and the processes thereafter are repeated.

Here, in the present embodiment, as a condition of switching from the synchronizing sensor position to the visual sensor position in step S6, from among the reciprocal switching conditions, a condition is employed such that the machining target at the target position 41 is included in the captured image of the visual sensor 13, i.e., the visual sensor position can be obtained.

Therefore, while the machining target at the target position 41 is not included in the captured image of the visual sensor 13 and therefore the visual sensor position cannot be obtained, loop processing of step S5, step S6: NO, and step S7: NO is repeated, and the positioning control of the robot 11 using the synchronizing sensor position in the B-direction and H-direction is carried out.

For example, during the machining operation between times t3 and t4 shown in FIG. 5, the positioning control of the robot 11 is carried out using the synchronizing sensor position in the B-direction and H-direction so that vibration of the workpiece 2 in the B-direction or H-direction is compensated for.

Here, in the example of FIG. 5, it is assumed that the workpiece 2 has two machining targets. Therefore, at time t4, when the machining operation of the machining tool 12 on the first machining target is complete, the robot 11 performs a moving operation to place the tip of the machining tool 12 close to the target position 41 of the second machining target in the period between times t4 and t6, which is described as "moving" in the timing chart of the robot 11.

However, since the tip position of the machining tool 12 is far off the target position 41 of the second machining target, the second machining target is not included in the captured image of the visual sensor 13, and the visual sensor position cannot be obtained until time t5.

Therefore, until time t5, loop processing of step S5, step S6: NO, and step S7: NO is repeated, and the positioning control of the robot 11 is carried out using the synchronizing sensor position in the B-direction and H-direction.

After that, at time t5, the tip position of the machining tool 12 comes close enough to the target position 41 of the second machining target so that the second machining target is included in the captured image of the visual sensor 13 and the visual sensor position can be obtained. That means that the switching condition is satisfied at time t5, YES is determined in step S6, and control proceeds to step S8.

In step S8, the CPU 101 switches the feedback information again from the synchronizing sensor position to the visual sensor position.

Control goes back to step S5, and the processes thereafter are repeated. This means that loop processing of step S5, step S6: NO, and step S7: NO is repeated, and visual servo control is carried out using the visual sensor position in all of the T-direction, B-direction, and H-direction, as the positioning control of the robot 11.

As a result of such visual servo control, in the example of FIG. 5, the deviation described above disappears at time t6, the visual servo control stops, and the moving operation of the robot 11 is halted.

The CPU 101 controls machining operation of the machining tool 12 on the second machining target. For example, in FIG. 5, the machining operation of the machining tool 12 is performed in the period between times t6 and t7, which is described as "machining" in the timing chart of the robot 11.

Therefore, in the example of FIG. 5, at time t6, the machining target at the target position 41 is no longer included in the captured image of the visual sensor 13, and the visual sensor position can no longer be obtained. That is, the switching condition is satisfied at time t6, YES is determined in step 36, and control proceeds to step S8.

In step S8, the CPU 101 switches the feedback information from the visual sensor position to the synchronizing sensor position.

Control goes back to step S5, and the processes thereafter are repeated. That is, during the machining operation between times t6 and t7, positioning control of the robot 11 is carried out using the synchronizing sensor position in the B-direction and H-direction so that the vibration of the workpiece 2 in the B-direction or H-direction is compensated for.

As described above, in the example of FIG. 5, it is assumed that the workpiece 2 has two machining targets. Therefore, when the machining operation of the machining tool 12 on the second machining target is complete at time t7, the overall machining operation on the workpiece 2 is also complete.

Then, in the period between times t7 and t8, which is described as "moving" in the timing chart of the robot 11, the robot 11 performs a moving operation to place the tip of the machining tool 12 back to the default position.

Therefore, until time t8 clearly no machining target is included in the captured image of the visual sensor 13 and the visual sensor position cannot be obtained. Consequently, until time t8 also, loop processing of step S5, step S6: NO, and step S7: NO is repeated, and positioning control of the robot 11 is carried out using the synchronizing sensor position in the B-direction and H-direction.

When the tip of the machining tool 12 goes back to the default position at time t8, the positioning control of the robot 11 is complete. Therefore, YES is determined in step S7, and control proceeds to step S9.

In step S9, the CPU 101 terminates the synchronizing control of the robot moving mechanism 14 with the conveyance carriage 18.

In step S10, the CPU 101 carries out control to move the robot moving mechanism 14 to the default position.

With this, the robot moving processing ends.

According to the present embodiment, the following effects can be obtained.

The robot control device 17 can carry out positioning control of the robot 11 using a result detected by the synchronizing sensor 15 as well as a result detected by the visual sensor 13.

This means that, for example, in a case in which no detection result of the visual sensor 13 is can be obtained or, if any, the detection result is of low accuracy, during or immediately before a machining operation by the machining tool 12, it is possible to carry out positioning control of the robot 11 using the detection result of the synchronizing sensor 15 instead of the visual sensor 13.

With this, even during or immediately before a machining operation of the machining tool 12, positioning control accuracy of the robot 11 is improved, and, as a result, the machining accuracy of the machining tool 12 is improved.

It should be noted that the present invention is not limited to the present embodiment, and variations, improvements and the like within a scope in which an object of the present invention can be achieved are included in the present invention.

For example, in positioning control of the robot 11, the visual sensor position acquired from the captured image of the visual sensor 13 is used as feedback information in the present embodiment. However, the feedback information is not limited to the position information used in the present embodiment. It is possible to use the position of the target position 41 of a machining target detected by any kind of detecting method. This means that a sensor for detecting the position of the target position 41 is not limited to the visual sensor 13 of the present embodiment, and any kind of sensor can be employed.

Similarly, in positioning control of the robot 11, a synchronizing sensor position of the synchronizing sensor 15 was used employed as feedback information in the present embodiment. However, the feedback information is not limited to the position information employed in the present embodiment. It is possible to employ a specific position of the conveyance carriage 18 detected by any kind of detecting method. This means that a sensor for detecting a specific position of the conveyance carriage 18 is not limited to the synchronizing sensor 15 of the present embodiment, and any kind of sensor can be employed.

Furthermore, in the present embodiment, although the synchronizing sensor position acquiring unit 61, the robot moving mechanism control unit 62, the visual sensor position acquiring unit 63, the feedback switching unit 64, the robot position control unit 65, and the machining control unit 66 shown in FIG. 2 are configured as a combination of software and hardware (related parts including the CPU 101), this configuration is merely an example, and the present invention is not limited thereto. For example, at least a part of the synchronizing sensor position acquiring unit 61, the robot moving mechanism control unit 62, the visual sensor position acquiring unit 63, the feedback switching unit 64, the robot position control unit 65, and the machining control unit 66 may be configured as dedicated hardware or may be configured as software.

In this way, the series of processes according to the present invention can be executed by software and also can be executed by hardware.

In a case in which the series of processes are to be executed by software, the program configuring the software is installed via a network or from a storage medium into a computer or the like. The computer may be a computer in which dedicated hardware is incorporated. Alternatively, the computer may be a computer capable of executing various functions by installing various programs, i.e., a general-purpose personal computer, for example.

The storage medium containing the program for a series of processes according to the present invention can be constituted not only by removable media distributed separately from the information processing device main body (the robot control device 17 in the present embodiment) for the purpose of supplying the program to a user, but also by a storage medium or the like supplied to the user in a state incorporated in the information processing device main body in advance. The removable media is composed of a magnetic disk (including a floppy disk), an optical disk, a magnetic optical disk, or the like, for example. The optical disk is composed of a CD-ROM (Compact Disk-Read Only Memory), a DVD (Digital Versatile Disk), and the like. The magnetic optical disk is composed of an MD (Mini-Disk) or the like. The storage medium supplied to the user in the state incorporated in the device main body in advance includes the ROM 102 in FIG. 3, a hard disk included in the storage unit 108 in FIG. 3, and the like, having the program stored therein, for example.

It should be noted that in the present specification the steps coding a program stored in the storage medium include not only the processes executed in a time series following this order, but also processes executed in parallel or individually, which are not necessarily executed in a time series.

In the present specification, a system denotes the overall apparatus constituted by a plurality of devices and units.

What is claimed is:

1. A machining system for performing predetermined machining on a machining target of a workpiece that is being conveyed, the system comprising:
    a conveyance unit that conveys the workpiece;
    a machining unit that carries out a moving operation to the machining target of the workpiece, and a machining operation on the machining target;
    a moving unit that moves the machining unit in parallel with the workpiece being conveyed by the conveyance unit;
    a machining target detection unit that is attached to the machining unit, and detects a position of the machining target;
    a conveyance detection unit that is attached to the moving unit and detects a specified position of the conveyance unit; and
    a control unit that controls movement of the moving unit using a detection result by the conveyance detection unit, and controls the moving operation of the machining unit using a detection result by the machining target detection unit or the conveyance detection unit.

2. A machining system as set forth in claim 1, further comprising a switching unit that switches information used in control of the moving operation of the machining unit from a detection result of one of the conveyance detection unit and the machining target detection unit, to a detection result of another thereof, if a predetermined condition is satisfied.

3. A machining system as set forth in claim 2, wherein the switching unit switches the information used for control of the moving operation of the machining unit to the detection result by the conveyance detection unit in a state in which the detection result by the machining target detection unit is used for control of the moving operation of the machining unit if a condition that the machining target detection unit cannot perform detection, as the predetermined condition, is satisfied.

4. A machining method of a machining system for performing predetermined machining on a machining target of a workpiece that is being conveyed, the machining system comprising:
    a conveyance unit that conveys the workpiece;
    a machining unit that carries out a moving operation to the machining target of the workpiece, and a machining operation on the machining target;
    a moving unit that moves the machining unit in parallel with the workpiece being conveyed by the conveyance unit;
    a machining target detection unit that is attached to the machining unit, and detects a position of the machining target; and
    a conveyance detection unit that is attached to the moving unit and detects a specified position of the conveyance unit; wherein
    the method comprises the steps of:
    controlling movement of the moving unit using a detection result by the conveyance detection unit; and
    controlling the moving operation of the machining unit using a detection result by the machining target detection unit or the conveyance detection unit.

* * * * *